Jan. 5, 1965  K. ZUSE  3,163,936
DIRECTION-BOUND ENGRAVING TOOL WITH PROGRAM CONTROL
Filed Aug. 15, 1962
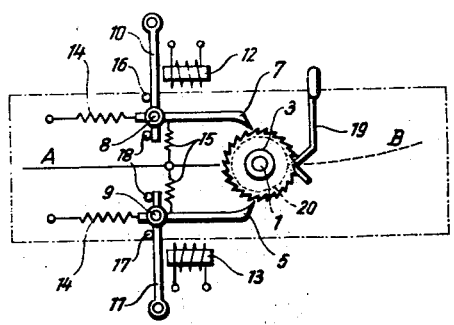
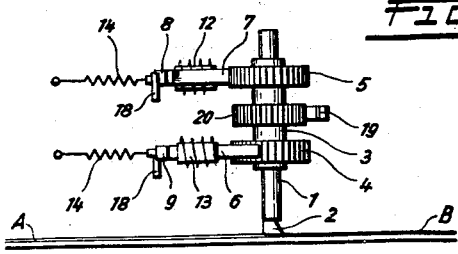
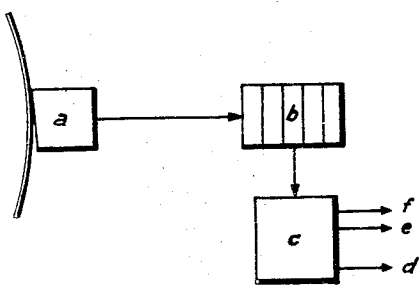
INVENTOR
KONRAD ZUSE
Attys

United States Patent Office 3,163,936
Patented Jan. 5, 1965

3,163,936
DIRECTION-BOUND ENGRAVING TOOL
WITH PROGRAM CONTROL
Konrad Zuse, Im Haselgrund, Hunfeld, Rhon, Germany
Filed Aug. 15, 1962, Ser. No. 216,936
Claims priority, application Germany, Aug. 31, 1961,
Z 8,945
5 Claims. (Cl. 33—18)

The present invention relates to a device with direction-bound engraving tool, which can be used particularly in coordinate designing devices, in which a program controlled head determines the course of the line to be engraved on a suitable surface.

It is known that patterns, e.g. for geodetical purposes are made in such a way that lines planed for maps are engraved by hand into suitable layers.

The present invention is based on the idea to make geometrical lines more quickly and more exactly in respect of the course, the width and the depth of the lines by a program-controlled engraving tool.

The present invention requires, when using automatically controled drawing tables, particular measures in order to obtain engravings which show an exact course of the lines, and a uniform thickness and depth thereof, since the cutting edge of the engraving tool must always be brought in the direction of the line to be engraved. The characterizing feature of the invention is that the program-controlled head of a coordinate designing apparatus carries an engraving device which makes directly engravings into a layer particularly suitable for this purpose, e.g. a prepared Astralon foil and the engraving tool of which is arranged normally to the engraving surface and besides pivotable and that the degree of pivoting of the engraving tool is adjusted by a control means from a program emitter of the automatic drawing table.

Only thus it is possible to cut an exact course of the lines directly into the surface to be engraved.

Such engraving devices are used, as already stated, for engraving particularly geodetical patterns.

The drawing shows the invention in a diagrammatic representation, FIG. 1 in plan view, FIG. 2 in lateral view, whereby in the two figures an example of a course of the engraving lines is shown and whereby A shows the engraved line, while B shows the planned line to be engraved. FIG. 3 shows the wiring diagram for controlling the part according to FIGS. 1 and 2.

On a program controlled head of a coordinate designing device the engraving apparatus described hereinafter is fastened.

The shaft 1 of the engraving tool is provided with the cutting edge 2 and is in a releasable connection with the sleeve 3 but is secured against shifting and rotation. The sleeve 3 has ratchet wheels 4, 5 firmly connected with it, which wheels have an opposite ratchet toothing. These wheels cooperate with ratchet pawls 6 and 7, which are influenced by electromagnets 12, 13 by means of the armatures 10, 11. The springs 14 have the task to pull the ratchet pawls 6, 7 with lugs provided on them against stops 18, whereby the ratchet pawls 6, 7 are pressed towards the outside and are brought out of engagement with their ratchet wheels 5, 4. The springs 15 serve to bring the ratchet pawls 6, 7 into engagement with their ratchet wheels 4, 5, when the magnets 12, 13 operate, i.e. when bringing forward the ratchet pawls 6, 7.

The lugs 16, 17 are provided for limiting the movement of the armatures 10, 11. When the magnets 12, 13 are switched-off, the springs 14 pull back the ratchet pawls 6, 7 into their neutral position. Thereby they come into engagement by means of the lugs connected with them with the stops 18 and disengage the ratchet pawls from their ratchet wheels 4, 5.

A stop wheel 20 holds by means of a stop nose 19 the engraving tool 1 in neutral position and secures it against undesirable rotation.

The mode of operation is as follows:

After a straight line forward feed of the engraving tool 1 along the line A this latter is locked by means of the shaft 1 and the sleeve 3 through the ratchet device 19, 20 against rotation. In the planned engraving line B, a rotation of the engraving tool is necessary. This rotation is obtained by current pulses of the magnet 13. Hereby the armature 11 is attracted and overcoming the force of the spring 14, the ratchet pawl 6 is brought into engagement with its ratchet wheel 4 by means of the spring 15 and shifts the said wheel into the direction B necessary for the engraving cutting edge. After this adjustment the stop device 19, 20 comes again into effect and keeps the engraving tool in this position. The magnet 13 is released and the ratchet pawl 6 returns into the original position.

In case of an opposite rotation of the shaft 1, which should become necessary as in case of a line to be engraved, showing e.g. downward (resp. towards the right) the magnet 12 comes into engagement through the armature with its ratchet pawl 7 with the ratchet wheel 5 and shifts this ratchet wheel for a corresponding distance.

If a straight engraved line passes over into a circle of small radius, several repetitions of the corresponding ratchet device take place by several program controlled pulses, by which the said device is able to engrave in connection with the coordinate designing device circle sections (and circles) of very small dimension.

The control means for operating the device consist in the shown emdodiment of the magnets 12, 13, which get their pulses according to the wiring diagram shown in FIG. 3 from a stripe reading device (a) over a command register (b) and deciphering device (c), whereby this latter gives besides the running order (d) also the orders for the rotation of the cutting edge towards the right=(e) or towards the left=(f).

What I claim is:
1. Engraving device adapted to be fastened to the head of a coordinate designing apparatus adapted to be controlled by programmed electrical signals from a source and adapted to be guided over the surface to be engraved, comprising a rotatable engraving shaft, a cutting edge being provided on said engraving shaft, electromagnets being connected and adapted to be energized and deenergized by said programmed electrical signal, ratchet wheels mounted on said engraving shaft, ratchet pawls mounted in cooperative relation with ratchet wheels and controlled by said electromagnets, said engraving shaft being rotatable by said ratchet pawls, so that said cutting edge is given the planned engraving direction.

2. Engraving device adapted to be fastened to the head of a coordinate designing apparatus adapted to be controlled by programmed electrical signals from a source and adapted to be guided over the surface to be engraved, comprising a rotatable engraving shaft extending normally to said surface, a cutting edge being provided on said engraving shaft, electromagnets being connected and adapted to be energized and deenergized by said programmed electrical signals, ratchet wheels mounted on said engraving shaft, ratchet pawls mounted for cooperation with said wheels and being controlled by said electromagnets, said engraving shaft being rotatable by said ratchet pawls, so that said cutting edge is given the planned engraving direction.

3. Engraving device adapted to be fastened to the head of a coordinate designing apparatus and controlled by programmed electrical signals from a source and adapted to be guided over the surface to be engraved, comprising a rotatable engraving shaft extending normally to said surface, a cutting edge being provided on said engraving shaft, electromagnets being energized and deenergized by said programmed electrical signals, ratchet wheels mounted on said engraving shaft, ratchet pawls mounted for cooperation with said wheels and being controlled by said electromagnets, and a locking device, said engraving shaft being rotatable by said ratchet pawls, so that said cutting edge is given the planned engraving direction, said locking device being provided against a not desired adjustment of said engraving shaft.

4. Engraving device adapted to be fastened to the head of a coordinate designing apparatus controlled by programmed electrical signals from a source and adapted to be guided over the surface to be engraved, comprising a rotatable engraving shaft extending normally to said surface, a cutting edge being provided on said engraving shaft, electromagnets being energized and deenergized by said programmed electrical signals, ratchet wheels mounted on said engraving shaft, ratchet pawls mounted for cooperation with said wheels and being controlled by said magnets, a notched disc fastened to said engraving shaft, and a lock spring engaging said notched disc, said engraving shaft being rotatable by said ratchet pawls, so that said cutting edge is given the planned engraving direction.

5. Engraving device adapted to be fastened to the head of a coordinate designing apparatus adapted to be controlled by programmed electrical signals from a source and adapted to be guided over the surface to be engraved, comprising a rotatable engraving shaft extending normally to said surface, a cutting edge being provided on said engraving shaft, a stripe-scanner, a command register, a decoder, a first electromagnet, a second electromagnet, a first ratchet wheel, a second ratchet wheel mounted on said shaft for rotation therewith, a first ratchet pawl for right hand rotation and a second ratchet pawl for left hand rotation, first and second ratchet pawls being mounted for cooperation with said ratchet wheels respectively being controlled by said first magnet and said second magnet respectively, and a locking device, said magnets being energized and denergized by said programmed electrical signals through said stripe-scanner, said command register and said decoder, said engraving shaft being rotatable by engagement of said ratchet wheels, said ratchet pawls, means being provided which give besides the running order for said head of said coordinate designing device also the orders for energizing and deenergizing of said first and of said second electromagnets, said locking device being provided against a not desired adjustment of said engraving shaft.

References Cited by the Examiner
UNITED STATES PATENTS

| 16,175 | 12/56 | Campbell | 33—31 |
| 2,642,659 | 6/53 | Black | 33—18 |

ISAAC LISANN, *Primary Examiner.*